(12) United States Patent
Brielbeck et al.

(10) Patent No.: US 6,279,536 B1
(45) Date of Patent: Aug. 28, 2001

(54) METHOD FOR KNOCK REGULATION IN AN INTERNAL COMBUSTION ENGINE

(75) Inventors: Gerhard Brielbeck, Ascha; Wilfried Kleczka, Munich, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/523,157

(22) Filed: Feb. 22, 2000

Related U.S. Application Data

(63) Continuation of application No. PCT/DE98/02420, filed on Aug. 19, 1998.

(30) Foreign Application Priority Data

Aug. 22, 1997 (DE) .............................................. 197 36 650

(51) Int. Cl.$^7$ ...................................................... F02P 5/00
(52) U.S. Cl. .................. 123/406.35; 123/406.37
(58) Field of Search ........................ 123/406.35, 406.36, 123/406.37, 435; 701/111, 115; 73/35.07

(56) References Cited

U.S. PATENT DOCUMENTS

| | | | | |
|---|---|---|---|---|
| 4,552,111 | * | 11/1985 | Tahara ............................. | 123/406.37 |
| 4,790,281 | * | 12/1988 | Mieno et al. .................... | 123/406.36 |
| 4,991,553 | * | 2/1991 | Kurihara et al. ................ | 123/406.37 |
| 5,040,510 | * | 8/1991 | Lrebs et al. ..................... | 123/406.37 |
| 5,140,962 | | 8/1992 | Iwata . | |
| 5,163,404 | * | 11/1992 | Witkowski et al ............. | 123/406.37 |
| 5,287,837 | | 2/1994 | Hashimoto et al. . | |
| 5,758,312 | * | 5/1998 | Park ............................... | 123/406.37 |

FOREIGN PATENT DOCUMENTS

| | | |
|---|---|---|
| 35 04 039 A1 | 8/1985 | (DE) . |
| 4006992A1 | 9/1990 | (DE) . |
| 4132832A1 | 4/1992 | (DE) . |
| 195 06 272 A1 | 8/1996 | (DE) . |
| 0399068A1 | 11/1990 | (EP) . |

* cited by examiner

*Primary Examiner*—John Kwon
(74) *Attorney, Agent, or Firm*—Herbert L. Lerner; Laurence A. Greenberg; Werner H. Stemer

(57) ABSTRACT

A method for knock regulation in an internal combustion engine, includes using signals from at least one knock sensor to obtain knock values (KW) and using these knock values (KW) to form knock thresholds (KS) with which the knock values (KW) are compared for the purpose of identifying engine knock. Each determined knock value (KW) is compared with a limit value (g) and is replaced by a replacement value (E) if it exceeds the limit value (g), for calculation of a practical knock threshold (KS).

11 Claims, No Drawings

METHOD FOR KNOCK REGULATION IN AN INTERNAL COMBUSTION ENGINE

CROSS-REFERENCE TO RELATED APPLICATION

This application is a continuation of copending International Application No. PCT/DE98/02420, filed Aug. 19, 1998, which designated the United States.

BACKGROUND OF THE INVENTION

Field of the Invention

The invention relates to a method for knock regulation in an internal combustion engine, wherein knock values are formed from signals of at least one knock sensor within a measurement window to be specified for each ignition, the knock values are used to form noise values, the noise values are used to form knock thresholds with which the knock values are compared, and engine knocking is identified if the knock values exceeds the knock threshold.

The starting point for knock regulation of a multicylinder internal combustion engine is a knock threshold KS for each individual cylinder (which is smaller than or equal to a specified maximum knock threshold $KS_{max}$ applicable to all of the cylinders), which is generally formed by knock sensor signals or by knock values KW determined for that cylinder from those knock signals (which is referred to below as knock values) and with which these knock values are compared. If the knock threshold KS is exceeded by the knock values KW, engine knock is inferred and, for example, the ignition point for this cylinder is retarded. If the knock threshold is not exceeded for a prolonged period, the ignition point is slowly advanced again.

If knock values assume a high value several times in succession, the knock threshold that is calculated from them continues to be increased, thereby requiring ever higher knock values to exceed that threshold. Knock regulation becomes less sensitive (engine knock is not detected) and the risk of engine damage increases.

European Patent Application 0 399 068 A1, corresponding to U.S. Pat. No. 5,040,510, has disclosed a cylinder-selective knock-regulating method in which sensor signals from a knock sensor are sampled at a specified sampling frequency in a particular angular range of the engine crankshaft, within a measurement window that can be specified for each cylinder. In that case, a specified number of the highest sample values from each measurement window is used to determine a knock value KW, by averaging for example, and a specified number of previous knock values KW is used to calculate a variable noise value GW, by sliding average formation, for example. A knock threshold KS is determined from that value, e.g. KS=(GW+S)*F or KS=GW*F+S, wherein S is a knock summand and F is a knock factor. Both variables are either specified values or are stored in tables as a function of at least one operating parameter (engine speed n, load L, etc.), preferably in characteristic maps as a function of engine speed n and load L. Both variables are used to fine-tune the knock threshold to ensure good knock detection, even with difficult boundary conditions, e.g. a poor signal-to-noise ratio at very low engine speeds.

The noise value GW can be determined more simply from the current knock value KW and the previous noise value GW, which implicitly contains the preceding knock values.

In order to prevent knock regulation becoming increasingly insensitive, as described above, provision is made in the case of the subject matter of European Patent Application 0 399 068 A1, corresponding to U.S. Pat. No. 5,040,510, not to use knock values that exceed a specified value for the calculation of the noise value GW.

If those knock values are included in the calculation with the value "0", then, in the case of intensive knocking, the knock threshold may become lower and lower and engine knock may be detected more and more often even though engine knock is not occurring. In that case, the ignition point may be retarded to an ever increasing extent.

However, if, as is more sensible, only knock values which have been assessed as free from knock are used, the knock threshold KS may be increased to an ever greater extent by a number of knock values KW which are just below KS, and knock regulation becomes increasingly insensitive.

SUMMARY OF THE INVENTION

It is accordingly an object of the invention to provide a method for knock regulation in an internal combustion engine, which overcomes the hereinafore-mentioned disadvantages of the heretofore-known methods of this general type in such a way that neither an impermissible increase in a knock threshold due to excessively high knock values, nor a lowering of the knock threshold due to nonallowance for high knock values, occurs.

DESCRIPTION OF THE PREFERRED EMBODIMENTS

With the foregoing and other objects in view there is provided, in accordance with the invention, a method for knock regulation in an internal combustion engine, which comprises forming knock values KW from signals of at least one knock sensor within a measurement window to be specified for each ignition; using the knock values KW to form noise values GW; using the noise values GW to form knock thresholds KS with which the knock values KW are compared; identifying engine knocking if the knock value KW exceeds the knock threshold KS; comparing each determined knock value KW with a limit value g; and, if it exceeds the limit value g, replacing the knock value KW for calculating the noise value GW and the knock threshold KS, with a replacement value E: for KW>g→KW=E.

Like the knock summand S and the knock factor F, the limit value g is either a specified value or is stored in tables as a function of at least one operating parameter (engine speed n, load L, etc.), preferably in characteristic maps as a function of the engine speed n and load L. Alternatively, in accordance with another mode of the invention, the limit value g is recalculated each time, for example from the value of a maximum knock threshold $KS_{max}$ which is applicable to all of the cylinders and of the knock factor S and the knock summand S, which are operating-parameter-dependent in accordance with the following formulae:

$$g = \frac{KS_{max}}{F} - S \text{ or } g = \frac{KS_{max} - S}{F}.$$

The replacement value E, with which the determined knock value KW is replaced if the latter is higher than the limit value g, is either a specified value or is stored in tables as a function of at least one operating parameter (engine speed n, load L, etc.), preferably in characteristic maps as a function of the engine speed n and the load L, or it is simply set so as to be equal to the limit value g: E=g.

In the case described, where limit values g are stored in tables or characteristic maps, comparison of the determined knock value KW with the limit value g taken from a table or a characteristic map can be performed quickly and in a simple manner. Otherwise, the limit value g has to be calculated.

In accordance with a further mode of the invention, the replacement of the knock value KW by the replacement value E can also be carried out rapidly and in a simple manner since the replacement value E is either taken from a table or a characteristic map or is set so as to be equal to the limit value g.

The respective points in the characteristic maps for the knock factor F, the knock summand S, the limit value g and the replacement value E in this case correspond to the operating point of the cylinder when the knock value KW was determined.

In accordance with an added mode of the invention, the maximum knock threshold $KS_{max}$ is either a specified value or is stored as a function of at least one operating parameter (engine speed n, load L, etc.) in a characteristic map (or a table) applicable to all of the cylinders.

In accordance with a concomitant mode of the invention, the variables knock factor F, knock summand S, limit value g and replacement value E are stored as a function of at least one operating parameter (engine speed n, load L etc.) either in tables or characteristic maps (or tables) applicable to all of the cylinders or characteristic maps (or tables) for individual cylinders.

This ensures, in the case of every cylinder, that the noise value GW represents the noise behavior of the cylinder without assuming excessively high or excessively low values, i.e. both the noise value GW and the knock threshold KS dependent on it assume practical values, even if there is an assumed relation of high knock values KW.

In the case of characteristic maps or tables which are not cylinder-selective, the values are calculated or specified as for a single cylinder and applied to all of the other cylinders.

Other features which are considered as characteristic for the invention are set forth in the appended claims.

Although the invention is described herein as embodied in a method for knock regulation in an internal combustion engine, it is nevertheless not intended to be limited to the details presented, since various modifications may be made therein without departing from the spirit of the invention and within the scope and range of equivalents of the claims.

The method of operation of the invention, however, together with additional objects and advantages thereof will be best understood from the foregoing description of specific embodiments.

We claim:

1. A method for knock regulation in an internal combustion engine, which comprises:

forming knock values from signals of at least one knock sensor within a measurement window to be specified for each ignition;

using the knock values to form noise values;

using the noise values to form knock thresholds with which the knock values are compared;

identifying engine knocking if the knock value exceeds the knock threshold;

comparing each determined knock value with a limit value; and replacing the knock value for calculating the noise value and the knock threshold, with a replacement value, if it exceeds the limit value.

2. The method according to claim 1, which comprises forming the limit value g in accordance with one of the formulas:

$$g = \frac{KS_{max}}{F} - S \text{ and } g = \frac{KS_{max} - S}{F},$$

wherein F is a knock factor, S is a knock summand, and $KS_{max}$ is a maximum knock threshold applicable to all cylinders.

3. The method according to claim 2, which comprises setting the maximum knock threshold applicable to all cylinders as a specified value.

4. The method according to claim 2, which comprises storing the maximum knock threshold applicable to all cylinders in a characteristic map as a function of at least one operating parameter.

5. The method according to claim 2, which comprises storing the maximum knock threshold applicable to all cylinders in a table as a function of at least one operating parameter.

6. The method according to claim 2, which comprises storing each of the variables knock factor, knock summand, limit value and replacement value as a function of at least one operating parameter in tables applicable to all cylinders.

7. The method according to claim 2, which comprises storing each of the variables knock factor, knock summand, limit value and replacement value as a function of at least one operating parameter in tables for individual cylinders.

8. The method according to claim 2, which comprises storing each of the variables knock factor, knock summand, limit value and replacement value as a function of at least one operating parameter in characteristic maps applicable to all cylinders.

9. The method according to claim 2, which comprises storing each of the variables knock factor, knock summand, limit value and replacement value as a function of at least one operating parameter in characteristic maps for individual cylinders.

10. The method according to claim 2, which comprises setting the variables knock factor, knock summand, limit value and replacement value as specified values.

11. The method according to claim 1, which comprises setting the replacement value equal to the limit value.

* * * * *